United States Patent
Parla et al.

(10) Patent No.: US 11,924,107 B2
(45) Date of Patent: Mar. 5, 2024

(54) CLOUD-NATIVE WORKLOAD OPTIMIZATION

(71) Applicant: Cisco Technology, Inc., San Jose, CA (US)

(72) Inventors: Vincent E. Parla, North Hampton, NH (US); Kyle Andrew Donald Mestery, Woodbury, MN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/493,398

(22) Filed: Oct. 4, 2021

(65) Prior Publication Data
US 2023/0106228 A1 Apr. 6, 2023

(51) Int. Cl.
*H04L 47/125* (2022.01)
*H04L 47/10* (2022.01)
*H04L 47/2416* (2022.01)
*H04L 47/52* (2022.01)
*H04L 47/726* (2022.01)

(52) U.S. Cl.
CPC ........ *H04L 47/125* (2013.01); *H04L 47/2416* (2013.01); *H04L 47/29* (2013.01); *H04L 47/528* (2013.01); *H04L 47/726* (2013.01)

(58) Field of Classification Search
CPC ... H04L 47/125; H04L 47/2416; H04L 47/29; H04L 47/528; H04L 47/726
See application file for complete search history.

(56) References Cited

U.S. PATENT DOCUMENTS

2015/0095584 A1\* 4/2015 Chockler ............ H04L 67/5682
711/135
2016/0165006 A1 6/2016 Fitzpatrick et al.
(Continued)

FOREIGN PATENT DOCUMENTS

WO WO2017141071 A1 8/2017

OTHER PUBLICATIONS

PCT Search Report and Written Opinion dated Nov. 17, 2022 for PCT Application No. PCT/US22/42632, 13 pages.
(Continued)

*Primary Examiner* — Jung H Park
(74) *Attorney, Agent, or Firm* — Lee & Hayes P.C.

(57) ABSTRACT

Techniques for orchestrating workloads based on policy to operate in optimal host and/or network proximity in cloud-native environments are described herein. The techniques may include receiving flow data associated with network paths between workloads hosted by a cloud-based network. Based at least in part on the flow data, the techniques may include determining that a utilization of a network path between a first workload and a second workload is greater than a relative utilization of other network paths between the first workload and other workloads. The techniques may also include determining that reducing the network path would optimize communications between the first workload and the second workload without adversely affecting communications between the first workload and the other workloads. The techniques may also include causing at least one of a redeployment or a network path re-routing to reduce the networking proximity between the first workload and the second workload.

20 Claims, 7 Drawing Sheets

(56) References Cited

U.S. PATENT DOCUMENTS

| | | |
|---|---|---|
| 2018/0095776 A1 | 4/2018 | Tsai |
| 2018/0124167 A1 | 5/2018 | Fitzpatrick et al. |
| 2020/0092193 A1 | 3/2020 | Tillotson et al. |
| 2020/0110625 A1* | 4/2020 | Warnicke ............ H04L 67/1021 |
| 2020/0341794 A1 | 10/2020 | Martin |
| 2020/0412612 A1* | 12/2020 | Cherunni ................ H04L 41/40 |

OTHER PUBLICATIONS

Prakash, et al, "Resource utilization prediction with multipath traffic routing for congestion-aware VM migration in cloud computing", Indian Journal Of Science & Technolofy, vol. 14, No. 7, Feb. 20, 2021, pp. 636-651.
Wojciechowski, Lukasz, et al., "NetMarks: Network Metrics-AwaRe Kubernetes Scheduler Powered by Service Mesh", IEEE Confrerence on Computer Communications, May 10, 2021, pp. 1-9.

\* cited by examiner

CLOUD-NATIVE WORKLOAD OPTIMIZATION

TECHNICAL FIELD

The present disclosure relates generally to orchestrating workloads based on policy to operate in optimal host and/or network proximity in cloud-native environments.

BACKGROUND

Cloud-native environments create scenarios where teams can independently build functionality to host services that they operationalize to perform particular tasks. One of the advantages of this model, however, is also a disadvantage in that independent operationalization tends to lead to sub-optimal deployments in practice. For example, a first team might build a first service and deploy and operate it in a cloud-native environment. Similarly, a second team might build a second service and deploy it in the cloud-native environment. It is quite likely, however, that these two services will end up being operationalized on two different host systems with the possibility of a service-mesh running between the two workload nodes. This results in a suboptimal networking solution as packets typically need to traverse several layers and be routed in a service-mesh.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
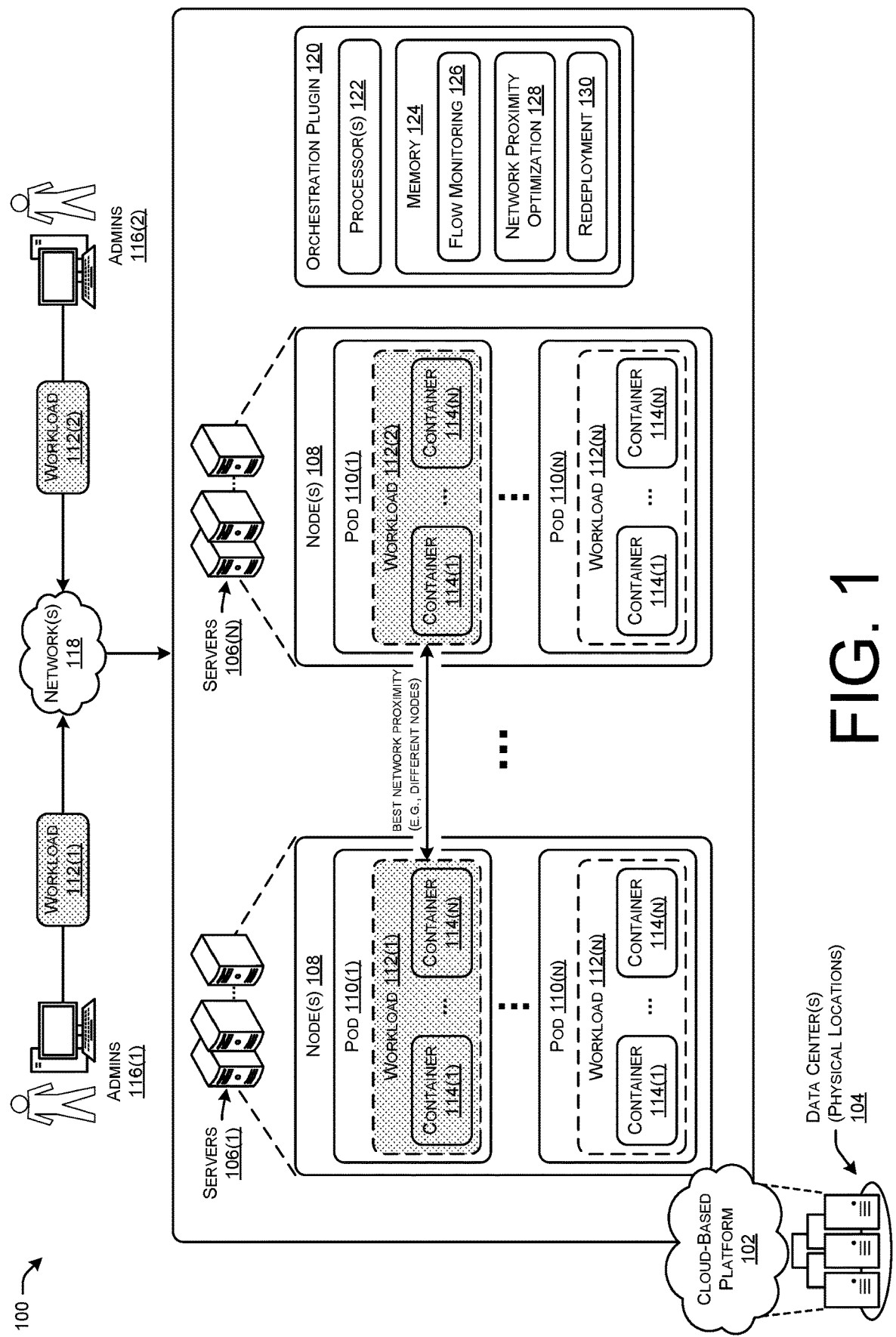
FIG. 1 illustrates a system-architecture diagram of an example environment that can implement aspects of the technologies disclosed herein. The environment includes a cloud-based platform in which two related workloads are placed on different nodes, resulting in an optimal network proximity.

This disclosure describes techniques for, among other things, orchestrating workloads based on policy to operate in optimal host and/or network proximity in cloud-native environments. By way of example, and not limitation, a method according to the techniques disclosed herein may include receiving flow data associated with a network path between a first workload hosted by a scalable application service platform and a second workload hosted by the scalable application service platform. In some examples, the method may also include determining, based at least in part on the flow data, that a utilization of the network path is greater than a relative utilization of other network paths between the first workload and other workloads of the scalable application service platform. Based at least in part on the utilization being greater than the relative utilization, the method may include determining that reducing the network path would optimize communications between the first workload and the second workload without adversely affecting communications between the first workload and the other workloads. Additionally, the method may include causing redeployment of at least one of the first workload or the second workload within the scalable application service platform such that the network path between the first workload and the second workload is reduced.

Additionally, the techniques described herein may be performed by a system and/or device having non-transitory computer-readable media storing computer-executable instructions that, when executed by one or more processors, performs the method described above.

Example Embodiments

As described above, cloud-native environments create scenarios where teams can independently build functionality to host services that they operationalize to perform particular tasks. One advantage of this model, however, is also a disadvantage in that independent operationalization tends to lead to sub-optimal deployments in practice. For example, two related workloads (e.g., applications, services, etc.) built by different teams may be deployed on different host systems (e.g., nodes, pods, etc.) of a cloud-based platform, resulting in a suboptimal networking solution as packets sent between the two workloads may need to traverse several layers and/or be routed in a service-mesh.

Ideally, a dynamic mechanism would place the workloads with better host and/or networking proximity. In other words, a better way of doing this would be to "orchestrate" the workloads such that they are in the best proximity to one another based on some policy or criteria that adequately expresses their relationship. While many of today's cloud-native, scalable application service platforms (e.g., Kubernetes) support the use of PodAffinity to co-locate workloads, PodAffinity requires a high degree of coordination across the teams creating configuration (YAML) files and is completely static in nature. PodAffinity also does not allow for runtime analysis to be done to more optimally operationalize configurations for better network and/or host proximity. Additionally, it is not always possible or desirable to run two strongly associated workloads on the same node because there may be insufficient compute resources to co-locate the two workloads.

Accordingly, this disclosure describes a plugin for cloud-native, scalable application service platforms (e.g., Kubernetes and other orchestration system technologies) that allows two or more disparate, but related workloads to be optimally orchestrated to have the best possible networking proximity. That is, this disclosure describes an orchestration plugin and techniques for placing two workloads as close together from an orchestration perspective such that they have the best possible internetworking outcome. According to the techniques disclosed, policies, intents, measurements, and/or metadata may be used to determine a best networking and/or host proximity for different workloads while allowing different teams to continue to independently operationalize their workloads.

In some examples, an orchestration plugin may monitor network flows (e.g., using eBPF programs or other techniques) and determine if workloads are intercommunicating at a high rate relative to other network communication paths to/from those workloads. In such scenarios, the orchestration plugin may calculate an optimal network proximity of the workloads relative to how they are currently orchestrated and, if a change is warranted, the orchestration plugin may automatically re-deploy the workloads with better network proximity, taking into account other factors such as what each workload is also connecting with in addition to the peer workload. For instance, the orchestration plugin may refrain from moving the workload if moving the workload might adversely affect other network paths for that workload. Additionally, or alternatively, the orchestration plugin may refrain from moving the workload if a network re-routing is possible. In some examples, the network proximity calculation may take into account other factors, such as anti-Affinity requirements, critical network paths from each workload that might be adversely affected by a deployment change, and the like. In at least one example where all constraining requirements are met and a better workload-to-workload communication path can be achieved with no negative side effects, the orchestration plugin may re-deploy/configure the affected workloads to achieve the improved network proximity outcome. Additionally, any host co-location benefits that can be realized may also be accounted for in addition to networking. For example, if co-locating two workloads avoids costs of inter-workload encryption operations, then a co-location of those two workloads may occur if other compute constraints of the workloads can be met.

The orchestration system plugin as described in this disclosure may analyze network interrelationships between nodes using techniques such as social graphs, micro-segmentation, and the like to determine flow and data densities between interconnected nodes. The orchestration plugin may also evaluate hops, latency costs, and other networking factors as part of the evaluation process. Since any one node can have many interconnects and even similar networking loads between several of those interconnects, the orchestration plugin may look at all of the network relationships and determine the best topology for the overall system. That is, the orchestration plugin may optimize network interconnects by causing a rewiring of the network or a redeployment of the nodes in order to improve overall network proximity between the nodes in the system.

By way of example, and not limitation, a method according to the techniques described herein may include receiving flow data associated with communications between workloads hosted by a cloud-based network. In some examples, the flow data may be associated with a network path between a first workload hosted by the cloud-based network and a second workload hosted by the cloud-based network. The flow data may include, in some instances, a network 5-tuple including a source IP address, a source port, a destination IP address, a destination port, and a protocol type. In at least one example, the cloud-based network is a scalable application service platform (e.g., Kubernetes or another scalable container orchestration system).

In some examples, the method may include determining that a utilization of the network path is greater than a relative utilization of other network paths between the first workload and other workloads of the cloud-based network. In one example, the utilization of the network path and/or the relative utilization is/are determined based at least in part on the flow data. In at least one example, the flow data is indicative of a frequency in which the first workload communicates with the second workload via the network path (e.g., number of packets sent over a period of time). Additionally, or alternatively, the flow data may be indicative of a size (e.g., number of bits or bytes) or magnitude associated with traffic that is sent over the network path between the first workload and the second workload.

In some examples, the method may include determining that reducing the network path would optimize communications between the first workload and the second workload without adversely affecting communications between the first workload and the other workloads. In one example, this may be performed based at least in part on the utilization being greater than the relative utilization. In another example, this may comprise calculating an optimal network proximity between the first workload and the second workload and determining that a difference between the optimal network proximity and a current network proximity is greater than a threshold difference. In some examples, determining that reducing the network path would optimize communications comprises determining that reducing the network path would increase available bandwidth between the first workload and the second workload, reduce latency associated with sending traffic between the first workload and the second workload, eliminate an encryption operation associated with sending traffic between the first workload and the second workload, and/or the like.

In some examples, the method may also include causing a redeployment or a network path re-routing to reduce the network proximity between the first workload and the second workload. For instance, at least one of the first workload or the second workload may be redeployed within the cloud-based network such that the network path between the first workload and the second workload is reduced. In at least one example, the first workload and the second workload are hosted on separate nodes within the cloud-based network prior to the redeployment, and subsequent to the redeployment the first workload and the second workload are hosted on a same node within the cloud-based network. In another example, prior to causing a redeployment, an alternative routing for the network path that would optimize the communications may be determined, and the network path may be re-routed according to the alternative routing instead of causing the redeployment.

In some instances, the method may include evaluating a policy associated with at least one of the first workload or the second workload prior to causing a redeployment. The policy may indicate whether the first workload or the second workload is a candidate for redeployment. For example, the policy may indicate anti-Affinity requests, critical routing paths from a workload, and the like.

The techniques described herein provide for several advantages and improvements in computer-related technology. For instance, the techniques allow for a more dynamic allocation of resources and better placement of components in nodes. Additionally, in some instances workloads may be placed on a same pod, node, or server, which can have many advantages as some technologies can be highly performant across different containers if those containers are running on the same host node, pod, server, etc. Furthermore, by locating workloads in closer proximity to one another, latency can be reduced for communications between workloads, thereby improving operation of cloud-native, scalable application service platforms as a whole.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that can implement aspects of the technologies disclosed herein. The environment includes a cloud-based platform 102 in which two related workloads 112(1) and 112(2) are placed on different nodes 108, resulting in an optimal network proximity.

The cloud-based platform 102 may comprise one or more data center(s) 104 that include various networking devices, such as, for example, servers 106(1)-106(N) (where N represents any number greater than or equal to one), which can be physical servers or virtual servers. The data center(s) 104 may be located across geographic areas, and the cloud-based platform 102 may be a distributed network through which end users (often customers) may interact via user devices to manage or otherwise interact with a service provided by the cloud-based platform 102. The cloud-based platform 102 may be representative of a scalable application service platform, such as Kubernetes, for example, or another type of scalable container orchestration system.

The cloud-based platform 102 may provide on-demand availability of computing system resources of physical server(s) 106, such as data storage, computing power (e.g., CPU, GPU, etc.), networking, databases, etc., without direct active management by consumers. In some examples, the cloud-based platform 102 may be managed and maintained by a service provider such that consumers do not have to invest in and maintain the computing infrastructure for their computing resource needs. Generally, a consumer may be provided access to, or allocated use of, a portion of the computing resources of physical server(s) 106 in the cloud-based platform 102. The cloud-based platform 102 may scale, such as by spinning up resources or spinning down resources, based on demand for the individual consumers. Portions of the cloud-based platform 102 may be allocated using hardware virtualization such that portions of the cloud-based platform 102 can be configured and managed by the consumer (e.g., security configuration, load balancing configuration, etc.). However, the cloud-based platform 102 need not be managed by a service provider, and can be managed by any entity, including the end user themselves that run the applications or services.

In some examples, the physical server(s) 106 may host one or more node(s) 108. A node 108 may be a virtual or physical machine that is managed by a control plane of the cloud-based platform 102. The node(s) 108 may contain one or more services necessary to run one or more pods 110(1)-110(N) (where N represents any number greater than or equal to one). The cloud-based platform 102 may run one or more workloads 112(1)-112(N) (e.g., applications, services, etc.) by placing one or more containers 114(1)-114(N) into the pods 110 to run on the node(s) 108. Although different topologies and/or architectures are contemplated. Each container 114 may be configured to execute one of various operations and act as one or more virtual components for the cloud-based platform 102. In some examples, the containers 114 may host at least one process associated with the workload 112.

Generally, the number of containers 114 may scale based on a number of end users interacting with the cloud-based platform 102. The end users may comprise one or more of individual users, groups of users, organizations, businesses, or other entities that interact with the cloud-based platform 102 via respective user devices. The user devices may be any type of computing device capable of connecting to the cloud-based platform 102 via a suitable data communications network such as, but not limited to, a laptop or desktop computer, a tablet computing device, a server computer, a television, or a mobile telephone.

In some examples, the admins 116(1) and 116(2) may build the workloads 112(1) and 112(2), respectively, and deploy them on the cloud-based platform 102 via the network(s) 118. The admins 116(1) and 116(2) may be associated with a same organization, and the workloads 112(1) and 112(2) may be related. As such, when each of the workloads 112(1) and 112(2) are deployed on the cloud-based platform 102, they may not be deployed within network proximity of one another, even though they are related. The orchestration plugin 120, however, may monitor network flows and determined that the workloads 112(1) and 112(2) are communicating at a high rate. In response, the orchestration plugin 120 may redeploy the workloads 112(1) and 112(2) within the cloud-based platform 102 such that they are within networking proximity. As shown in FIG. 1, a best network proximity for the workloads 112(1) and 112(2) is to be on different nodes 108. In some examples, the nodes 108 hosting the workloads 112(1) and 112(2) may be on different servers 106, and in other examples the nodes 108 may be on a same server 106.

The orchestration plugin 120 may include one or more processor(s) 122 and memory 124 that may be communicatively coupled with the one or more processor(s) 122. The memory 124 of the orchestration plugin 120 may store a flow monitoring component 126, a network proximity optimization component 128, and a redeployment component 130.

The flow monitoring component 126 may monitor network flows between servers 106, nodes 108, pods 110, workloads 112, and/or containers 114. In some examples, the flow monitoring component 126 may monitor utilization of network flows between the various components of the cloud-based platform 102. In this way, the flow monitoring component 126 may determine that two or more servers 106, nodes 108, pods 110, workloads 112, and/or containers 114 are communicating with each other at a high rate (e.g., frequency, magnitude, etc.) relative to other servers 106, nodes 108, pods 110, workloads 112, and/or containers 114 of the cloud-based platform 102. At least partially responsive to determining that two or more servers 106, nodes 108, pods 110, workloads 112, and/or containers 114 are communicating with each other at a high rate, the network proximity optimization component 128 may calculate an optimal network proximity for the two or more servers 106, nodes 108, pods 110, workloads 112, and/or containers 114. If the optimal network proximity differs from a current network proximity by more than a threshold, then the redeployment component 130 may cause the two or more servers 106, nodes 108, pods 110, workloads 112, and/or containers 114 to be redeployed within the cloud-based platform 102 within network proximity of one another. Additionally, or alternatively, the redeployment component 130 may determine whether a re-wiring or re-routing of the network is possible to optimize communications, rather than redeploying the components.

Figure 2:
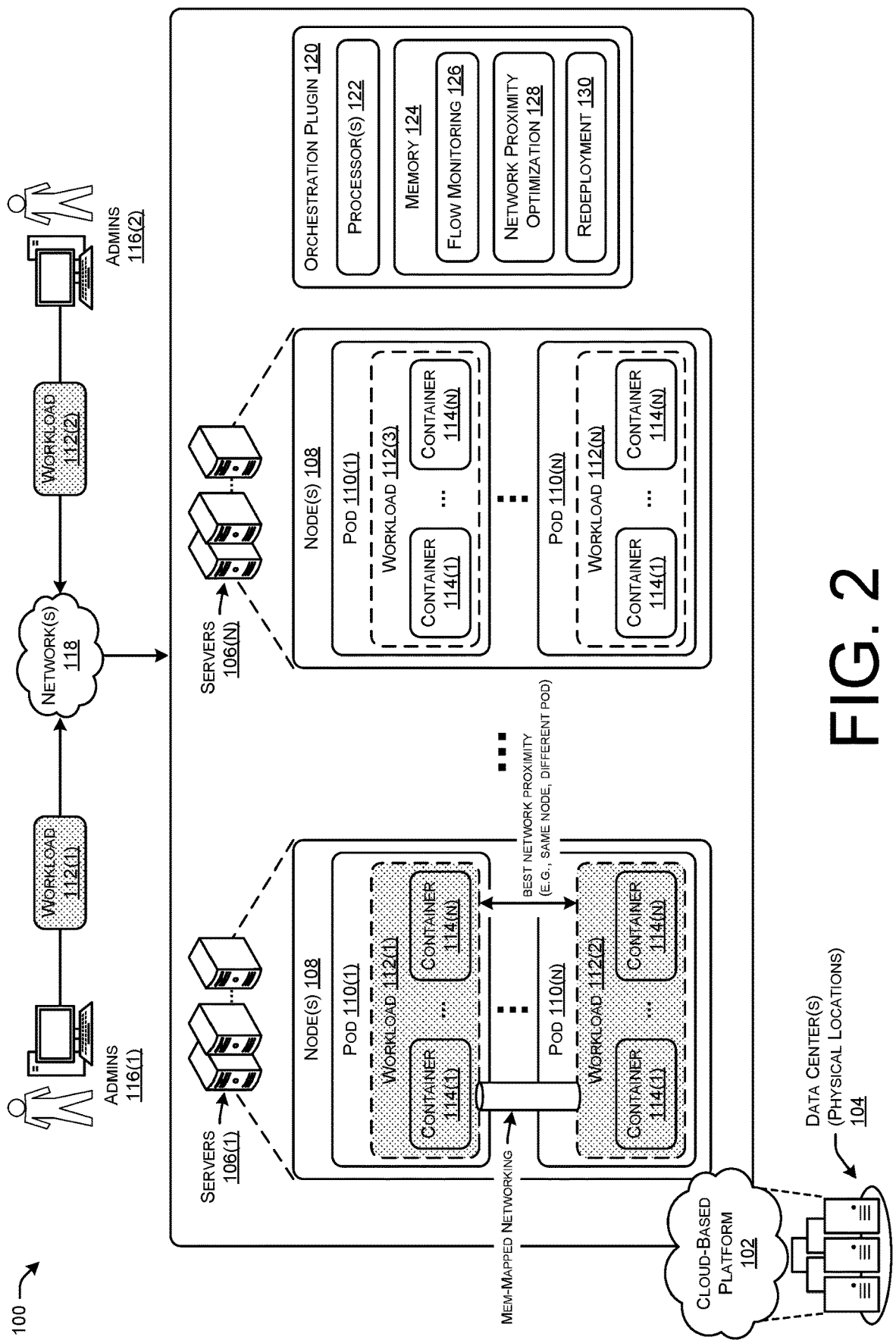
FIG. 2 illustrates a system-architecture diagram of the example environment including the cloud-based platform. The two related workloads are placed on a same node but different pods, resulting in an optimal network proximity.

FIG. 2 illustrates a system-architecture diagram of the example environment 100 including the cloud-based platform 102. The two related workloads 112(1) and 112(2) are placed on a same node 108 of the cloud-based platform 102, but in different pods 110, resulting in an optimal network proximity. As shown, the workload 112(1) has been placed within the pod 110(1) and the workload 112(2) has been placed in the pod 110(N) of the node 108. Additionally, the workloads 112(1) and 112(2) may utilize mem-mapped networking to communicate with each other in a fast path, as shown.

In some examples, the orchestration plugin 120 (e.g., the flow monitoring component 126 of the orchestration plugin) may receive flow data associated with communications between the workloads 112(1) and 112(2). The flow data may be associated with a network path between the workload 112(1) hosted by the cloud-based platform 102 and the workload 112(2) hosted by the cloud-based platform 102.

In some examples, the orchestration plugin 120 may determine that a utilization of the network path is greater than a relative utilization of other network paths between the workload 112(1) and other workloads of the cloud-based platform 102, such as the workload 112(3). In one example, the utilization of the network path and/or the relative utilization is/are determined based at least in part on the flow data received by the flow monitoring component 126. In at least one example, the flow data is indicative of a frequency in which the workload 112(1) communicates with the workload 112(2) via the network path (e.g., number of packets sent over a period of time). Additionally, or alternatively, the flow data may be indicative of a size (e.g., number of bits or bytes) or magnitude associated with traffic that is sent over the network path between the workloads 112(1) and 112(2).

In some examples, the orchestration plugin 120 (e.g., the network proximity optimization component 128) may determine that reducing the network path would optimize communications between the workload 112(1) and the workload 112(2) without adversely affecting communications between the workload 112(1) and the other workloads, such as the workload 112(3). In one example, the network proximity optimization component 128 may determine this based at least in part on the utilization being greater than the relative utilization. In some instances, the network proximity optimization component 128 may calculate an optimal network proximity between the workloads 112(1) and 112(2) and determine that a difference between the optimal network proximity and a current network proximity is greater than a threshold difference. In some examples, the network proximity optimization component 128 may determine that reducing the network path would increase available bandwidth between the workloads 112(1) and 112(2), reduce latency associated with sending traffic between the workloads 112(1) and 112(2), eliminate an encryption operation associated with sending traffic between the workloads 112(1) and 112(2), and/or the like.

In some examples, the orchestration plugin 120 (e.g., the redeployment component 130) may cause at least one of a redeployment of the workloads 112(1) or 112(2) or a network path re-routing to reduce the network proximity between the workloads 112(1) and 112(2). For instance, at least one of the workloads 112(1) or 112(2) may be redeployed within the cloud-based platform 102 such that the network path between the workloads 112(1) and 112(2) is reduced. In at least one example, the workloads 112(1) and 112(2) may be hosted on separate nodes 108 of the cloud-based platform 102 prior to the redeployment, and subsequent to the redeployment, as shown in FIG. 2, the workloads 112(1) and 112(2) are hosted on a same node 108 and/or server 106(1) of the cloud-based platform 102.

In some instances, the orchestration plugin 120 (e.g., the redeployment component 130 or another component of the orchestration plugin 120) may evaluate a policy associated with at least one of the workloads 112(1) or 112(2) prior to causing a redeployment. The policy may indicate whether the workloads 112(1) and/or 112(2) are candidates for redeployment. For example, the policy may indicate anti-Affinity requests, critical routing paths from the workloads 112(1) and 112(2), and the like.

Figure 3:
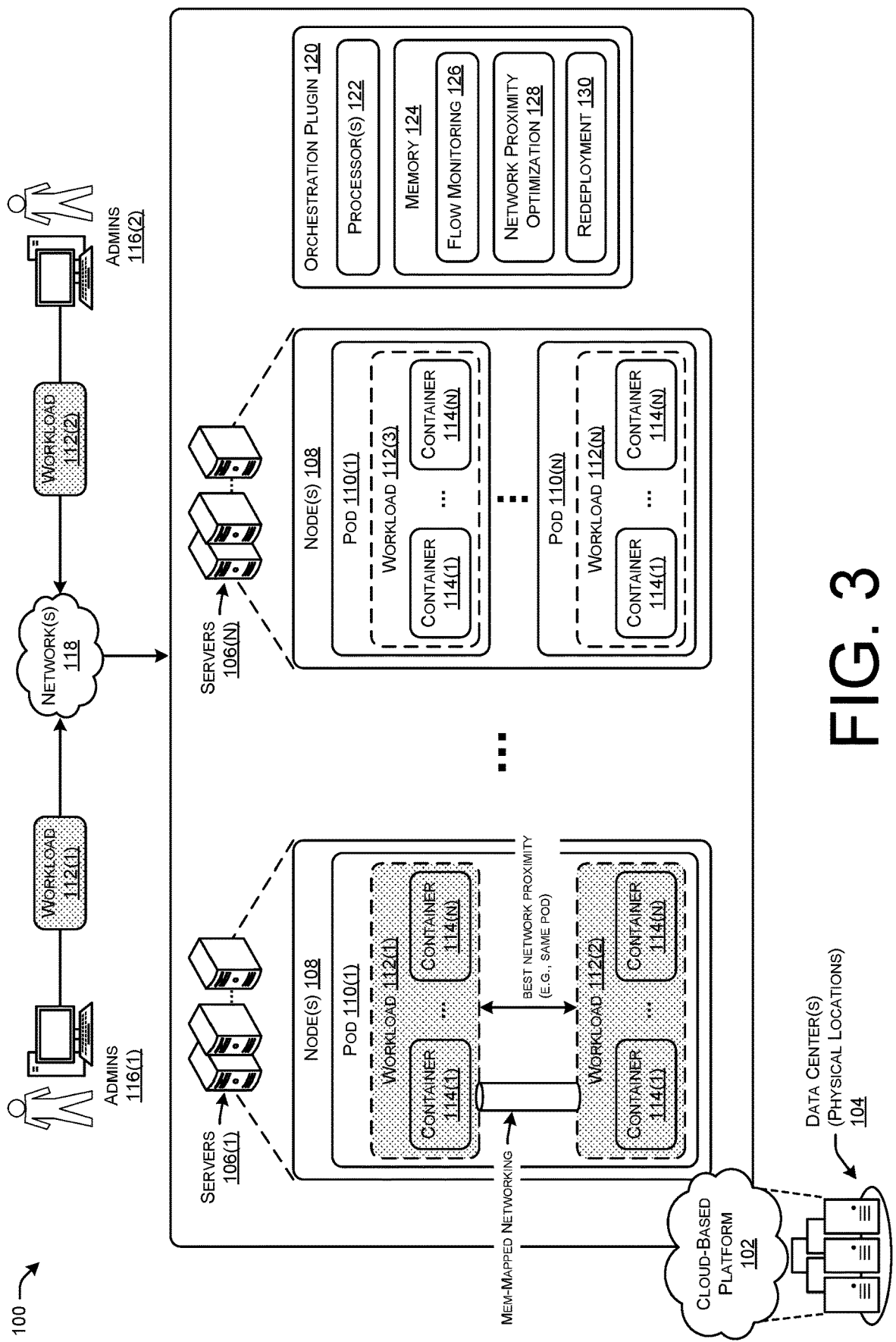
FIG. 3 illustrates a system-architecture diagram of the example environment including the cloud-based platform. The two related workloads are placed on a pod, resulting in an optimal network proximity.

FIG. 3 illustrates a system-architecture diagram of the example environment 100 including the cloud-based platform 102. The two related workloads 112(1) and 112(2) are placed on a same pod 110(1) of the cloud-based platform 102, resulting in an optimal network proximity. Additionally, the workloads 112(1) and 112(2) may utilize mem-mapped networking to communicate with each other in a fast path, as shown.

In some examples, the orchestration plugin 120 (e.g., the flow monitoring component 126 of the orchestration plugin) may receive flow data associated with communications between the workloads 112(1) and 112(2). The flow data may be associated with a network path between the workload 112(1) hosted by the cloud-based platform 102 and the workload 112(2) hosted by the cloud-based platform 102.

In some examples, the orchestration plugin 120 may determine that a utilization of the network path is greater than a relative utilization of other network paths between the workload 112(1) and other workloads of the cloud-based platform 102, such as the workload 112(3). In one example, the utilization of the network path and/or the relative utilization is/are determined based at least in part on the flow data received by the flow monitoring component 126. In at least one example, the flow data is indicative of a frequency in which the workload 112(1) communicates with the workload 112(2) via the network path (e.g., number of packets sent over a period of time). Additionally, or alternatively, the flow data may be indicative of a size (e.g., number of bits or bytes) or magnitude associated with traffic that is sent over the network path between the workloads 112(1) and 112(2).

In some examples, the orchestration plugin 120 (e.g., the network proximity optimization component 128) may determine that reducing the network path would optimize communications between the workload 112(1) and the workload 112(2) without adversely affecting communications between the workload 112(1) and the other workloads, such as the workload 112(3). In one example, the network proximity optimization component 128 may determine this based at least in part on the utilization being greater than the relative utilization. In some instances, the network proximity optimization component 128 may calculate an optimal network proximity between the workloads 112(1) and 112(2) and determine that a difference between the optimal network proximity and a current network proximity is greater than a threshold difference. In some examples, the network proximity optimization component 128 may determine that reducing the network path would increase available bandwidth between the workloads 112(1) and 112(2), reduce latency associated with sending traffic between the workloads 112(1) and 112(2), eliminate an encryption operation associated with sending traffic between the workloads 112(1) and 112(2), and/or the like.

In some examples, the orchestration plugin 120 (e.g., the redeployment component 130) may cause at least one of a redeployment or a network path re-routing to reduce the network proximity between the workloads 112(1) and 112(2). For instance, at least one of the workloads 112(1) or 112(2) may be redeployed within the cloud-based platform 102 such that the network path between the workloads 112(1) and 112(2) is reduced. In at least one example, the workloads 112(1) and 112(2) may be hosted on separate nodes 108 and/or pods 110 of the cloud-based platform 102 prior to the redeployment, and subsequent to the redeployment, as shown in FIG. 3, the workloads 112(1) and 112(2) are hosted on a same pod 110(1) of the cloud-based platform 102.

In some instances, the orchestration plugin 120 (e.g., the redeployment component 130 or another component of the orchestration plugin 120) may evaluate a policy associated with at least one of the workloads 112(1) or 112(2) prior to causing a redeployment. The policy may indicate whether the workloads 112(1) and/or 112(2) are candidates for redeployment. For example, the policy may indicate anti-Affinity requests, critical routing paths from the workloads 112(1) and 112(2), and the like.

Figure 4:
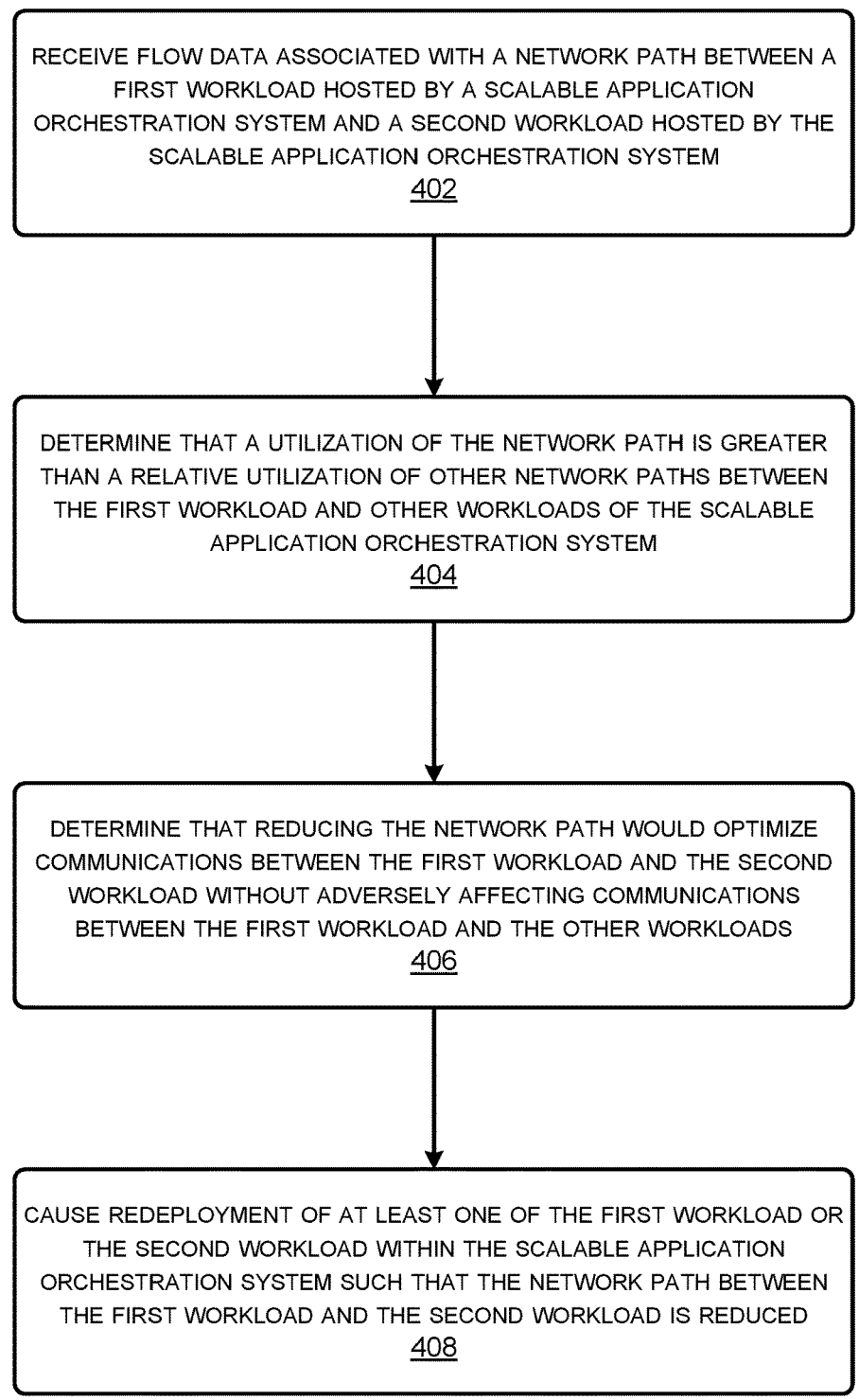
FIG. 4 is a flow diagram illustrating an example method for orchestrating workloads based on policy to operate in optimal host and/or network proximity in cloud-native environments.
Figure 5:
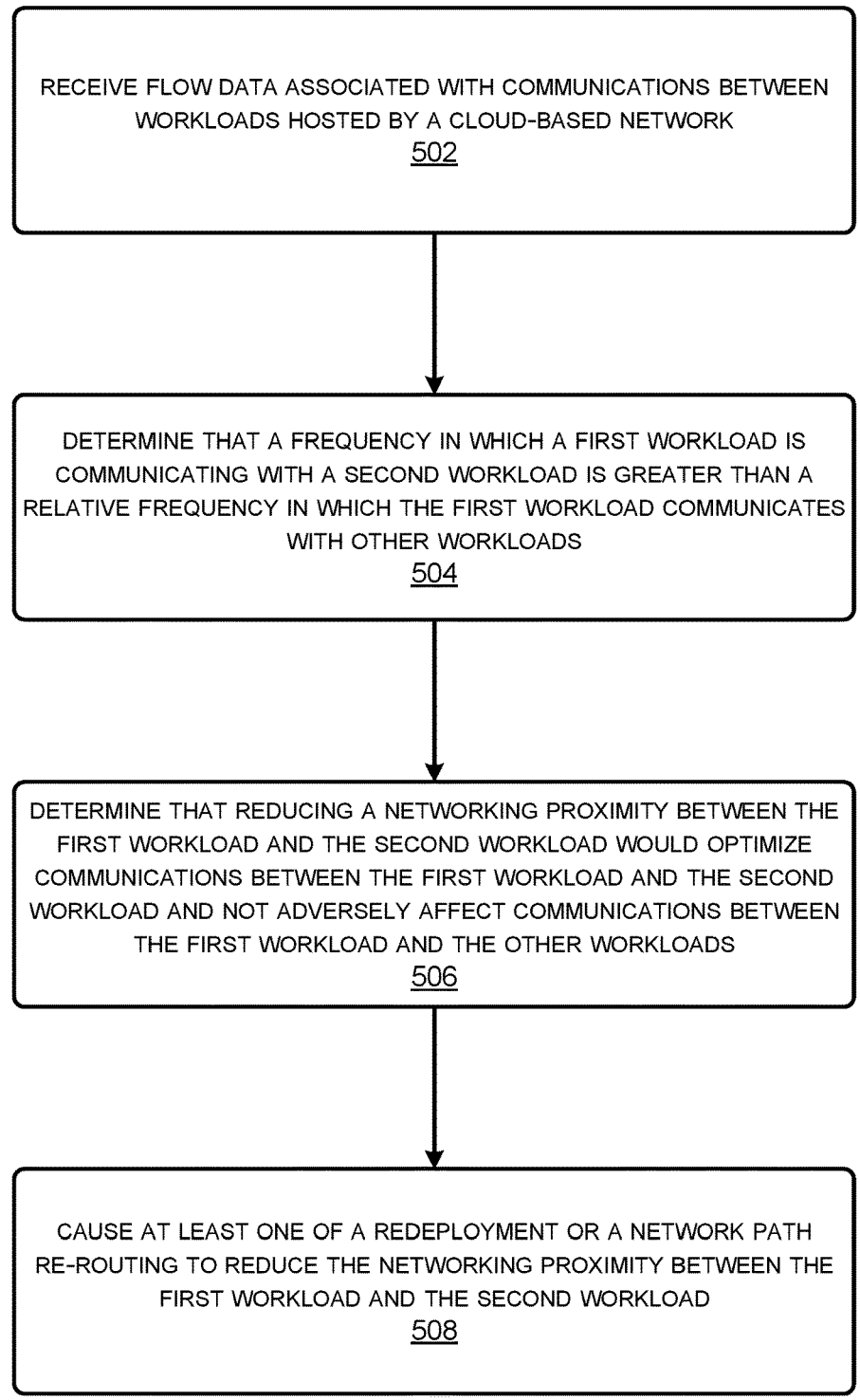
FIG. 5 is a flow diagram illustrating another example method for orchestrating workloads based on policy to operate in optimal host and/or network proximity in cloud-native environments.

FIGS. 4 and 5 illustrate flow diagrams of example methods 400 and 500 that illustrate aspects of the functions performed at least partly by the cloud-based platform 102 and/or the orchestration plugin 120, as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 is a flow diagram illustrating an example 400 method for orchestrating workloads based on policy to operate in optimal host and/or network proximity in cloud-native environments. The method 400 begins at operation 402, which includes receiving flow data associated with a network path between a first workload hosted by a scalable application orchestration system and a second workload hosted by the scalable application orchestration system. For instance, the orchestration plugin 120 may receive flow data associated with a network path between the workload 112(1) and the workload 112(2) hosted by the cloud-based platform. Additionally, or alternatively, the orchestration plugin 120 may receive flow data associated with communications between servers 106, nodes 108, pods 110, and/or containers 114 of the cloud-based platform 102.

At operation 404, the method 400 includes determining that a utilization of the network path is greater than a relative utilization of other network paths between the first workload and other workloads of the scalable application orchestration system. For instance, the orchestration plugin 120 may determine that the utilization of the network path is greater than the relative utilization of the other network paths between the workload 112(1) and the other workloads 112(3)-112(N).

At operation 406, the method 400 includes determining that reducing the network path would optimize communications between the first workload and the second workload without adversely affecting communications between the first workload and the other workloads. For instance, the orchestration plugin 120 may determine that reducing the network path would optimize communications between the workloads 112(1) and 112(2) without adversely affecting communications between the workload 112(1) and the other workloads 112(3)-112(N).

At operation 408, the method 400 includes cause redeployment of at least one of the first workload or the second workload within the scalable application orchestration system such that the network path between the first workload and the second workload is reduced. For instance, the orchestration plugin 120 may cause the redeployment of at least one of the workloads 112(1) within the cloud-based platform 102 such that the network path between the workloads 112(1) and 112(2) is reduced.

FIG. 5 is a flow diagram illustrating another example method 500 for orchestrating workloads based on policy to operate in optimal host and/or network proximity in cloud-native environments. The method 500 begins at operation 502, which includes receiving flow data associated with communications between workloads hosted by a cloud-based network. For instance, the orchestration plugin 120 may receive the flow data associated with the communications between the workloads 112 hosted by the cloud-based platform 102. Additionally, or alternatively, the orchestration plugin 120 may receive flow data associated with communications between servers 106, nodes 108, pods 110, and/or containers 114 of the cloud-based platform 102.

At operation 504, the method 500 includes determining that a frequency in which a first workload is communicating with a second workload is greater than a relative frequency in which the first workload communicates with other workloads. For instance, the orchestration plugin 120 may determine that the frequency in which the workload 112(1) is communicating with the workload 112(2) is greater than a relative frequency in which the workload 112(1) communicates with other workloads 112(3)-112(N).

At operation 506, the method 500 includes determining that reducing a networking proximity between the first workload and the second workload would optimize communications between the first workload and the second workload and not adversely affect communications between the first workload and the other workloads. For instance, the orchestration plugin 120 may determine that reducing the network proximity between the workloads 112(1) and 112(2) would optimize communications between the workloads 112(1) and 112(2) without adversely affecting communications between the workload 112(1) and the other workloads 112(3)-112(N).

At operation 508, the method 500 includes causing at least one of a redeployment or a network path re-routing to reduce the networking proximity between the first workload and the second workload. For instance, the orchestration plugin 120 may cause the at least one of the redeployment or the network path re-routing to reduce the networking proximity between the workloads 112(1) and 112(2).

Figure 6:
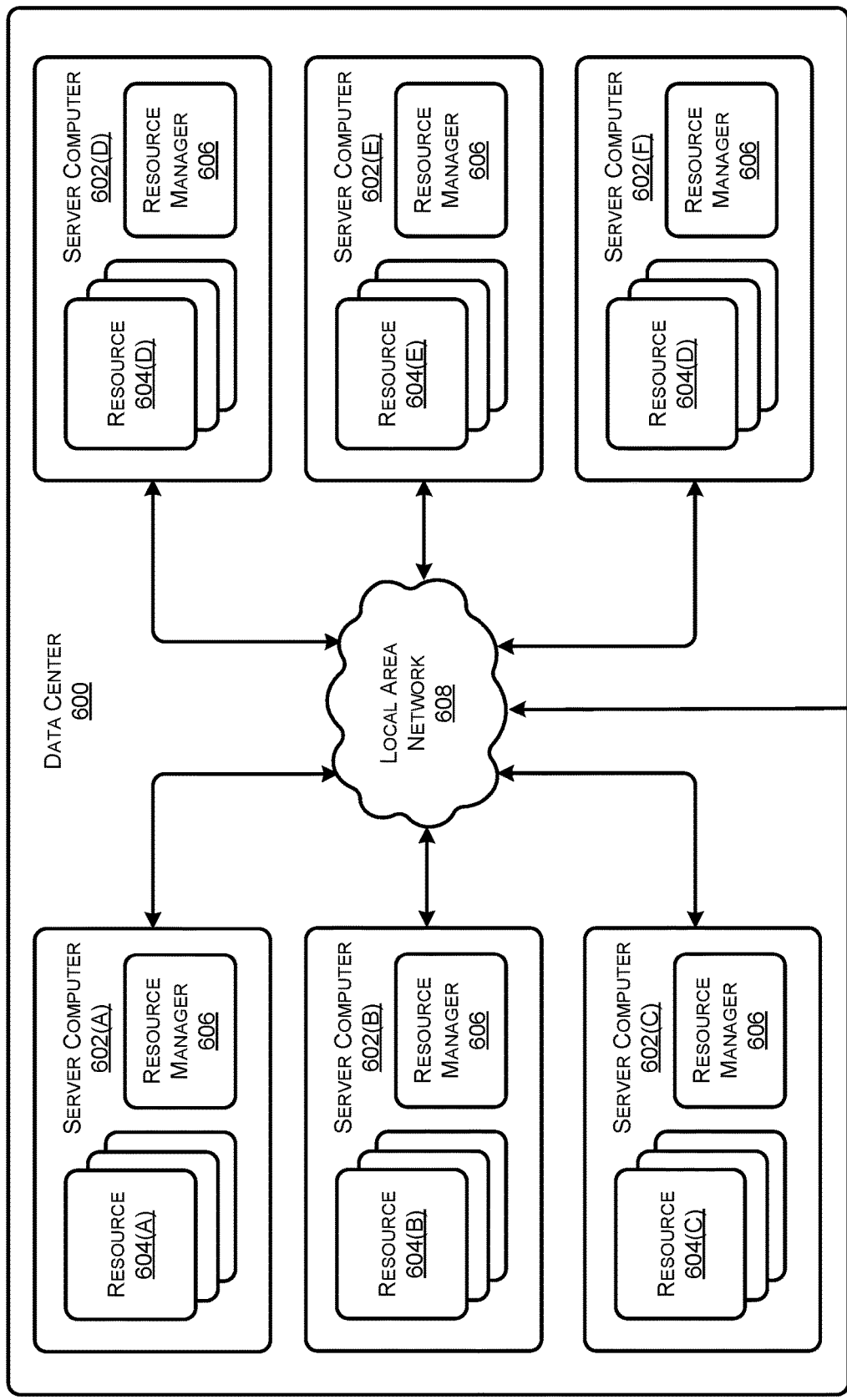
FIG. 6 is a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers 106 described herein.

The server computers 602 can be standard tower, rack-mount, or blade server computers configured appropriately for providing the computing resources described herein. As mentioned above, the computing resources provided by the cloud-based platform 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate local area network (LAN) 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized. In some examples, the server computers 602 may each execute one or more containers 114 that support a workload 112 (e.g., service or application) provisioned across a set or cluster of servers 602.

In some instances, the cloud-based platform 102 may provide computing resources, like application containers, VM instances, and storage, on a permanent or an as-needed basis. Among other types of functionality, the computing resources provided by the cloud-based platform 102 may be utilized to implement the various services described above. The computing resources provided by the cloud-based platform 102 can include various types of computing resources, such as data processing resources like application containers and VM instances, data storage resources, networking resources, data communication resources, network services, and the like.

Each type of computing resource provided by the cloud-based platform 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud-based platform 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
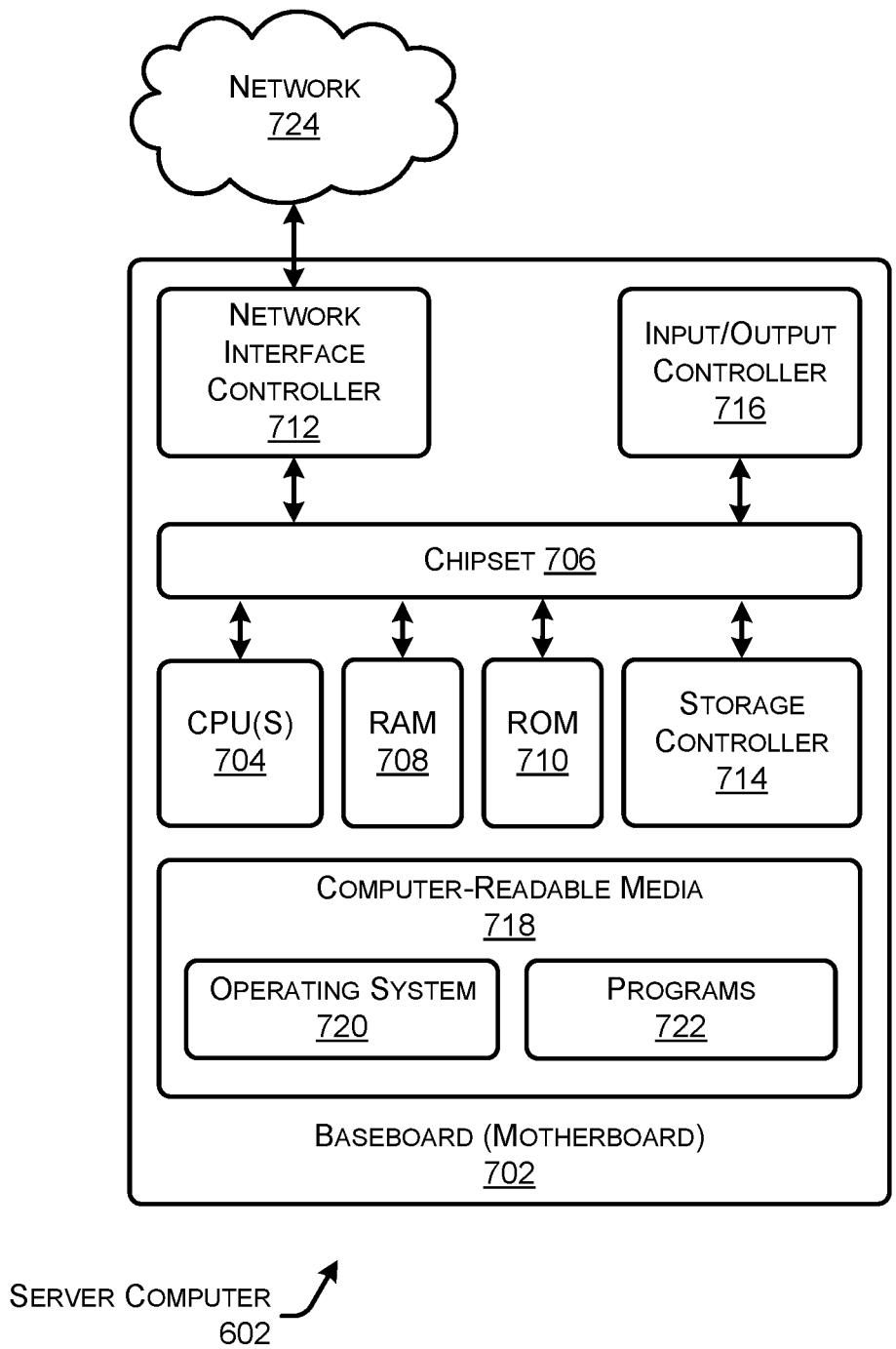
FIG. 7 is a computer architecture diagram showing an illustrative computer hardware architecture that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to the physical servers 106 described herein.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 602 to other computing devices over the network 708 (or 122). It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by the cloud-based platform 102, and or any components included therein, may be supported by one or more devices similar to computer 602. Stated otherwise, some or all of the operations performed by the cloud-based platform 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that any number of other operating systems can also be utilized, such as MacOS, RISC, BSD, IOS, etc. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

The server computer 602 may support a virtualization layer 724, such as one or more containers 114 executing on the server computer 602. In some examples, the virtualization layer 724 may be supported by a hypervisor that provides one or more virtual machines running on the server computer 602 to perform functions described herein. The virtualization layer 724 may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing instructions that, when executed by one or more processors, cause the system to perform operations comprising:
receiving flow data associated with a network path between a first workload running on a first node of a scalable application service platform and a second workload running on a second node of the scalable application service platform;
determining, based at least in part on the flow data, that a utilization of the network path is greater than a relative utilization of other network paths between the first workload and other workloads of the scalable application service platform;
based at least in part on the utilization being greater than the relative utilization, determining that reducing a network proximity between the first workload and the second workload would optimize communications between the first workload and the second workload without adversely affecting communications between the first workload and the other workloads; and
causing redeployment of the first workload to run on at least one of the second node or a third node of the scalable application service platform to reduce the network proximity between the first workload and the second workload, wherein the third node is closer in proximity to the second node than the first node.

2. The system of claim 1, wherein:
the flow data is indicative of a frequency in which the first workload communicates with the second workload via the network path; and
determining that the utilization is greater than the relative utilization comprises determining that the frequency is greater than a relative frequency in which the first workload communicates with the other workloads.

3. The system of claim 1, the operations further comprising evaluating a policy associated with at least one of the first workload or the second workload prior to causing the redeployment, the policy indicating whether the first workload or the second workload is a candidate for redeployment.

4. The system of claim 1, the operations further comprising:
prior to causing the redeployment, determining an alternative routing for the network path that would optimize the communications; and
based at least in part on determining the alternative routing:
causing the network path to be re-routed according to the alternative routing; and
refraining from causing the redeployment.

5. The system of claim 1, wherein:
the flow data is indicative of a size associated with traffic that is sent over the network path between the first workload and the second workload; and
determining that the utilization is greater than the relative utilization comprises determining that the size associated with the traffic is greater than a relative size associated with other traffic that is sent over the other network paths.

6. The system of claim 1, wherein determining that reducing the network path would optimize communications between the first workload and the second workload comprises:
calculating an optimal network proximity between the first workload and the second workload; and
determining that a difference between the optimal network proximity and a current network proximity is greater than a threshold difference.

7. The system of claim 1, wherein determining that reducing the network path would optimize communications comprises determining that reducing the network path would at least one of:
increase available bandwidth between the first workload and the second workload;
reduce latency associated with sending traffic between the first workload and the second workload; or
eliminate an encryption operation associated with sending traffic between the first workload and the second workload.

8. The system of claim 1, wherein causing redeployment of the first workload comprises causing redeployment of the first workload to a same pod as the second workload running on the second node.

9. A method comprising:
receiving flow data associated with a network path between a first workload running on a first node of a cloud based network and a second workload running on a second node of the cloud based network;
determining, based at least in part on the flow data, that a utilization of the network path is greater than a relative utilization of other network flows between the first workload and other workloads of the cloud based network;
based at least in part on the utilization being greater than the relative utilization, determining that reducing a network proximity between the first workload and the second workload would optimize communications between the first workload and the second workload without adversely affecting communications between the first workload and the other workloads; and
causing redeployment of the first workload to at least one of the second node or a third node of the cloud based network to reduce the network proximity between the first workload and the second workload, wherein the third node is closer in proximity to the second node than the first node.

10. The method of claim 9, wherein:
the flow data is indicative of a frequency in which the first workload communicates with the second workload via the network path; and
determining that the utilization is greater than the relative utilization comprises determining that the frequency is greater than a relative frequency in which the first workload communicates with the other workloads.

11. The method of claim 9, wherein:
the flow data is indicative of a size associated with traffic that is sent over the network path between the first workload and the second workload; and determining that the utilization is greater than the relative utilization comprises determining that the size associated with the traffic is greater than a relative size associated with other traffic that is sent over the other network paths.

12. The method of claim 9, further comprising evaluating a policy associated with at least one of the first workload or the second workload prior to causing the redeployment, the policy indicating whether the first workload or the second workload is a candidate for redeployment.

13. The method of claim 9, further comprising:
prior to causing the redeployment, determining an alternative routing for the network path that would optimize the communications; and
based at least in part on determining the alternative routing:
causing the network path to be re-routed according to the alternative routing; and
refraining from causing the redeployment.

14. The method of claim 9, wherein determining that reducing the network path would optimize communications between the first workload and the second workload comprises:
calculating an optimal network proximity between the first workload and the second workload; and
determining that a difference between the optimal network proximity and a current network proximity is greater than a threshold difference.

15. The method of claim 9, wherein determining that reducing the network path would optimize communications comprises determining that reducing the network path would at least one of:
increase available bandwidth between the first workload and the second workload;
reduce latency associated with sending traffic between the first workload and the second workload; or
eliminate an encryption operation associated with sending traffic between the first workload and the second workload.

16. The method of claim 9, wherein causing redeployment of the first workload comprises causing redeployment of the first workload to a same pod as the second workload running on the second node.

17. One or more non-transitory computer-readable media storing instructions that, when executed, cause one or more processors to perform operations comprising:
receiving flow data associated with communications between nodes of a cloud based network;
determining, based at least in part on the flow data, that a frequency in which a first node is communicating with a second node is greater than a relative frequency in which the first node communicates with a third node;
based at least in part on the frequency being greater than the relative frequency, determining that reducing a networking proximity between the first node and the second node would optimize communications between the first node and the second node and not adversely affect communications between the first node and the third node; and
causing at least one of a redeployment of the first node to a new host of the cloud based network or a network path re-routing between the first node and the second node to reduce the networking proximity between the first node and the second node.

18. The one or more non-transitory computer-readable media of claim 17, the operations further comprising:
evaluating a policy associated with the first node;
determining that the policy prohibits redeployment of the first node; and
based at least in part on the policy prohibiting redeployment, causing the re-routing of the network path to reduce the network proximity between the first node and the second node.

19. The one or more non-transitory computer-readable media of claim 17, wherein determining that reducing the network proximity would optimize communications between the first node and the second node comprises:
calculating an optimal network proximity between the first node and the second node; and
determining that a difference between the optimal network proximity and a current network proximity is greater than a threshold difference.

20. The one or more non-transitory computer-readable media of claim 17, wherein determining that reducing the network proximity would optimize communications comprises determining that reducing the network proximity would at least one of:
increase available bandwidth between the first node and the second node;
reduce latency associated with sending traffic between the first node and the second node; or
eliminate an encryption operation associated with sending traffic between the first node and the second node.

\* \* \* \* \*